April 26, 1960 H. W. ROCKWELL 2,933,838
AUTOMATIC DEPTH CONTROL FOR AN IMPLEMENT
Filed April 29, 1957 2 Sheets-Sheet 1

Inventor
Harvey W. Rockwell
By Charles L. Schwab
Attorney

April 26, 1960  H. W. ROCKWELL  2,933,838
AUTOMATIC DEPTH CONTROL FOR AN IMPLEMENT
Filed April 29, 1957  2 Sheets-Sheet 2

Inventor
Harvey W. Rockwell
Attorney

United States Patent Office 2,933,838
Patented Apr. 26, 1960

2,933,838
AUTOMATIC DEPTH CONTROL FOR AN IMPLEMENT

Harvey W. Rockwell, Cedar Rapids, Iowa, assignor to Allis-Chalmers Manufacturing Company, Milwaukee, Wis.

Application April 29, 1957, Serial No. 655,751

9 Claims. (Cl. 37—144)

This invention relates to material moving implements of the type adapted to be pushed by a motor vehicle and particularly to a means for controlling the depth of the cutting edge penetration as it is advanced over the ground.

Although the present invention is not limited thereto, it is especially applicable and will be shown and described in connection with a bulldozer mounted on a four wheel rubber tired tractor. A bulldozer blade is usually disposed transversely and forwardly of the front of the tractor and is attached at opposite sides to push beams. The push beams are generally pivotally secured to the tractor at some rearwardly located point to provide an approximately vertical movement as the blade is raised and lowered above the ground level. The pivotal movement of the push beams about their support connections on the tractor are accomplished by a suitable system of cables or hydraulic jacks. To make a desired cut or fill with the bulldozer blade, the tractor is advanced when the cutting edge of the blade is adjusted to its proper height.

Controlling the depth of the penetration of the cutting edge of the blade as the tractor advances has posed a problem in the past. Where the bulldozer is mounted on a rubber tired tractor, it has been particularly difficult to control the depth of the cutting edge penetration because of the natural resilience of the rubber tires. Regardless of whether the bulldozer is mounted on a tractor of the crawler or rubber tired type, the cutting edge of the bulldozer blade tends to dig in or lift out as the tractor passes over uneven terrain or as the cutting edge encounters an obstruction or a harder type of earth. Thus, it is desirable that neither variations in the type of earth encountered by the cutting edge nor the uneven travel of the tractor as it passes over irregular terrain should substantially affect the depth penetration of the cutting edge.

Various mechanisms have been devised in the past to insure uniform depth penetration of the cutting blade. Depth control mechanisms of an adjustable type are shown in the patent to F. H. Norris, U.S. 2,511,123 issued on June 13, 1950 and the patent to L. O. Bird, U.S. 1,964,617 issued on June 26, 1934. In both of these patents, hydraulic jacks are used to adjust the height of the ground runner, and a manual manipulation of a control valve is necessary to make any such adjustments in the vertical position of the runner. When the depth penetration of the cutting blade is disturbed by the rythmic bounce of the tractor, as it may in the case of a tractor supported by resilient rubber tires when it advances over an uneven surface, control of the depth penetration of the cutting edge by manual manipultion of a valve becomes extremely difficult. It is desirable, therefore, that some provision be made in the mechanism for automatic control of the depth of the cutting edge penetration.

It is a principal object of this invention, therefore, to provide a mechanism that will automatically control the depth penetration of the cutting edge of a bulldozer blade mounted on a tractor or other vehicle as it advances over the ground.

It is a further object of this invention to provide a mechanism for a bulldozer blade and the like which will utilize the forces exerted on the blade by its contact with the ground to maintain the parallel travel of the blade over the ground.

Another object of this invention is to provide a bulldozer or other tool mounted on push beams pivotally connected to a tractor or other vehicle, the travel of which can be maintained substantially parallel to the ground by both a manual means controlled by the operator and by an automatic means.

It is a more specific object of this invention to provide a depth control mechanism for a bulldozer and similar tools whereby the hydraulic jack used to regulate the amount of depth penetration is also used to lift the blade out of a working position.

It is still a further object of this invention to provide a parallel linkage for a bulldozer blade or other similar tool to maintain a trailing runner in a substantially parallel relationship to the cutting edge of the blade as the runner is acted upon by ground reaction forces to prevent the blade or tool from digging into the ground erratically as it advances over the ground.

It is still another object of this invention to provide a lever arm for a depth control mechanism for a bulldozer or similar tool having a fulcrum point that can be rigidly fixed in relationship to the tractor thereby permitting the forces reacting on the blade or tool when it cuts erratically to be transmitted by means of this lever arm to a trailing runner which opposes the tendency of the blade to be disturbed from its parallel travel over the ground.

Other objects and advantages of this invention are made apparent in the following specification by reference to the accompanying drawings, wherein:

Fig. 3 is a fragmentary view illustrating the mode of operation of the trailing runner when the bulldozer blade tends to dig in.

Figure 2:
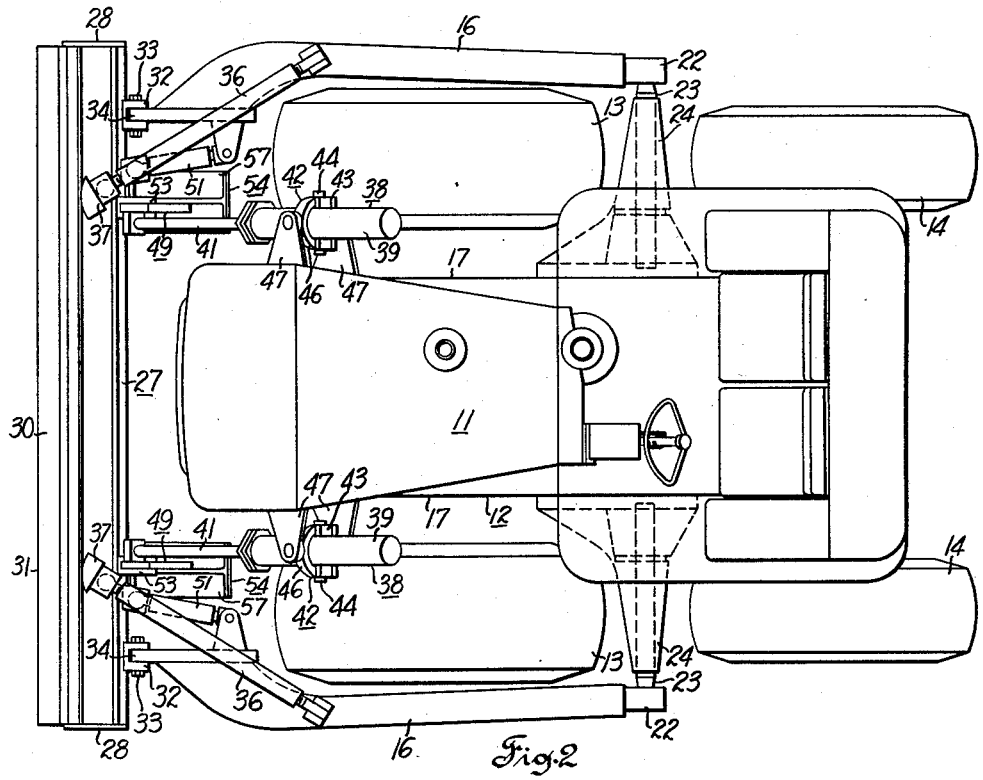
Fig. 2 is a plan view of the tractor and mechanism.
Figure 1:
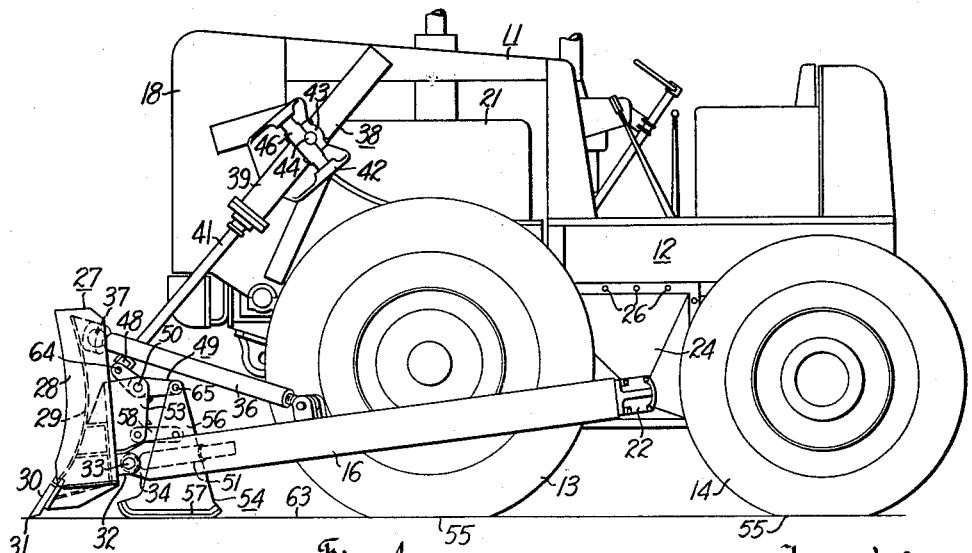
Fig. 1 is a side elevation of a rubber tired tractor with the mechanism embodying the present invention attached thereto.

Referring now to the drawings, particularly Figs. 1 and 2, the four wheel rubber tired tractor 11 chosen for the purposes of illustrating the principles of the present invention includes a longitudinally extending frame 12 supported by a front pair 13 and a rear pair 14 of laterally spaced rubber tired wheels. The tractor 11 is steered by the rear wheels 14 only. The front wheels 13 are not steerable and, as illustrated, the push beams 16 are mounted on the tractor 11 outside of the front wheels 13.

The tractor 11 has the main frame 12 which term is intended to apply to the entire lower portion of the vehicle that furnishes the principal structural support for an engine transmission, a clutching mechanism and final drive gearing, not shown. Included as a part of the main frame 12 are the side frames 17, which extend longitudinally and at the forward portion are utilized to support a hood 18 extending over a radiator, not shown, and an engine 21.

The two push beams 16 have a rectangular cross sectional form and are disposed respectively along opposite sides of the tractor 11 outside of the front wheels 13. At the rearward end of each of the push beams 16 a bearing member 22 is rigidly attached and engages a mating bearing member 23 mounted on a support bracket 24 attached to the main frame 12 between the front and rear wheels 13 and 14. Thus, the push beams 16 are pivotally connected to the tractor 11 by the support bracket 24 suitably secured to the tractor side frames 17 by a plurality of cap screws 26.

The bulldozer blade assembly 27 may be of any suitable construction, but it is shown in Figs. 1 and 2 as comprising a blade structure which is of conventional boxlike form built up from suitable steel plates welded together. The blade assembly 27 is disposed transversely in front of the tractor 11 and includes two end plates 28, an arcuate moldboard 29 extending between and attached to the end plates 28, and a cutting blade 30 secured rigidly to the lower edge of the moldboard 29 and presenting a cutting edge 31. A pair of clevises 32 attached to the rear side of the blade assembly 27 are used to pivotally connect the assembly to the push beams 16. A pair of pins 33 supported by the clevises 32 and passing through pad eyes 34 attached to the forward end of the push beams 16 form the pivotal connections.

The blade assembly 27 is normally maintained in rigid relation to push beams 16. An adjustable brace 36 extends upwardly and forwardly from the forward portion of each push beam 16 and is pivotally connected at the upper end to the rearward face of the moldboard 29 by means of a ball and socket connection 37. By adjusting the length of the braces 36, the rake of the blade assembly 27 may be varied. A pair of corner braces 51 holds the blade assembly 27 in lateral alignment with the push beams 16. These braces 51 have ball and socket type of connections where they join the rear side of the moldboard 29.

In order to provide for proper operation and control of the blade assembly 27, hydraulic jacks 38 are mounted on opposite sides of the tractor 11 adjacent to the front thereof. The jacks 38 are of the double acting type and include a cylinder 39 for reciprocably receiving a suitable piston, not shown, which carries the piston rod 41 extending from one end of the cylinder 39. The operation of the blade assembly 27 by the hydraulic jacks 38 is facilitated by the provision of a universal mounting 42 for each of the jacks 38 on the tractor 11. The mounting 42 consists of a member 43 secured to the cylinder 39 and is adapted to rotate on an axis provided by a supporting pin 44 carried on a ring 46, the ring 46 being rotatably supported on a yoke 47 attached to the tractor 11. Likewise, a universal type of connection 48 serving as a pivot means is provided between the outer end of each piston rod 41 and an adjusting lever 49.

Hydraulic systems used to control the supply of hydraulic fluid to the jacks 38 are well known in the art, and it is not deemed necessary to illustrate the details either of the pressure source or details of the control valves and lines other than to point out that when the jacks 38 are not being actuated, they are normally in a "hold" position. That is, the piston rods 41 are under hydraulic restraint and, for practical purposes, rigidly fixed with respect to the cylinders 39.

A pin 50 pivotally connects the adjusting lever 49 at an intermediate point to support bracket 53 rigidly attached to the rearward side of the moldboard 29. At its free ends it is pivotally connected to a trailing runner 54 having a triangular shaped upstanding portion 56 and a ground engaging flanged portion 57. A parallel link 58 spaced vertically below a connecting portion 59 of the lever 49 connects the runner 54 to the bracket 53 to permit the runner 54 to move in parallelism with the blade assembly 27. Considering the invention from the general point of view, bracket 53, portion 56, parallel link 58 and lever 49 together with their respective connecting pins serve as a linkage means for interconnecting the ground runner 54 and the blade assembly 27. Hydraulic jack 38 together with universal mounting 42 and the universal connection 48 in effect serve as an adjustable thrust transmitting means carried by the tractor main body. This thrust transmitting means is connected to the linkage means at pivot axis 64 and having a first range of operation for moving the blade assembly and ground runner between a raised position and a ground engaging position; and having a second range of operation for positively relatively moving the ground runner 54 in parallelism with respect to the blade assembly 27 while in the ground engaging position.

For a given adjusted position of rod 41 after the blade assembly is in the ground engaging position, movement of axis 64 with respect to the tractor is constrained to an arc having a radius measured by the distance between the center of pin 44 and the axis 64. It is, therefore, apparent that jack 38 in effect serves as a guide link connected at one end to the tractor body and at the other end to lever 49 of the linkage means for maintaining the linkage means in spaced relationship with the vehicle while the ground runner moves vertically in parallelism relative to the blade assembly.

The flanged portion 57 of the runner 54 serves as a ground engaging shoe having upturned ends to permit the shoe to slide over the ground. The position of the runner 54 relative to the cutting edge 31 is limited by two stops 61, 62 welded to the support brackets. When the lower parallel link 58 butts against the lower stop 62, the cutting edge 31 penetrates at a predetermined depth below the plane of travel 63. When the adjusting lever 49 butts against the upper stop 61, the cutting edge 31 is elevated at a predetermined height above the plane of travel 63. The plane of travel 63, as the term is used herein, denotes the common plane passing through the lowest vertical points of tangency 55 to the wheels 13, 14 of the tractor 11 and upon which the tractor would travel if the earth were a perfectly level, homogeneous and incompressible medium.

Thus, it can be readily seen that the depth penetration of the cutting edge 31 relative to the plane of travel 63 is regulated by the parallel movement of the runner 54 between the two stops 61, 62. To set the cutting edge 31 at a desired position, the operator actuates the hydraulic jacks 38 which serve to raise and lower the runner 54 by adjusting the lever 49. After the cutting edge 31 is set in position, the piston rod 41 being under hydraulic restraint and for all practical purposes rigidly fixed with reference to the tractor 11, the cutting edge 31 is then free to yield in parallelism with the runner 54 within the limits defined by the two stops 61, 62. The adjusting lever 49 for this condition of operation has its fulcrum at and pivots about the axis 64.

If it is desired to raise the bulldozer, the operator will cause the hydraulic jacks 38 to contract. The upward motion of the piston rod 41 will first react in forcing the runner 54 downward, and in effect, pull the cutting edge 31 upward, the adjusting lever 49 having its fulcrum at the axis 65. This leverage aids in lifting the blade assembly 27 until the continued upward movement of the lever 49 brings it in contact with the upper stop 61. During this first range of travel of the piston rod 41, the vertical position of the cutting edge 31 relative to the runner 54 is varied. After this point normal lifting of the blade assembly 27 is accomplished without the benefit of any leverage. The piston rod then enters into a second range of travel during which runner 54 is stationary relative to the cutting edge 31 and further movement of the piston rod serves to raise the blade assembly 27.

When the operator extends the hydraulic jacks 38 while the blade assembly 27 rests on the plane of travel, the connecting pin 50 becomes the fulcrum for the adjusting lever 49. The downward motion of the piston rod 41 acting on the lever 49 causes the ground runner 54 to be raised off the plane of travel 63 until the parallel link 58 butts against the stop 62. At this point of travel the parallel link 58 is rigidly held against the stop 62 and further downward motion of the piston rod 41 will normally allow the cutting edge 31 to penetrate below the plane of travel until the runner 54 contacts the ground and resists further penetration.

The operation of the automatic depth control mechanism should be apparent from the foregoing description. When the operator desires to make a uniform cut of a particular depth, he advances the tractor 11 with the blade assembly 27 in a lowered position. Due to the angle of the cutting blade 30, there is a tendency on the part of the blade 30 to dig into the ground as the tractor 11 advances. The operator may make further adjustments by actuating the jacks 38. When he has determined that the cutting edge 31 has attained the desired depth, he levels off the cut by slightly contracting the jack 38 to bring the ground engaging portion 57 of the runner 54 in horizontal alignment with the cutting edge of the blade 30. The runner 54 will now maintain the cutting edge 31 substantially in the plane of travel 63 by counteracting the downward thrust exerted against the blade 30 when the cutting edge 31 descends below the plane of travel 63.

The vertical position of the ground runner 54 relative to the cutting edge 31 is controlled by adjusting the lever 49. If the lever 49 is held by the hydraulic jack 38 against the upper stop 61 the cutting edge 31 will be maintained at its maximum position above the plane of travel 63. In this relative position the cutting edge 31 will be set for cutting an upward slope. When the lower parallel link abuts against the lower stop 62 the cutting edge 31 is set at its maximum distance below the plane of travel and will tend to cut a slope having a downward inclination.

According to the principles of the present invention, when the plane of travel 63 is substantially horizontal and it is desired to maintain the cut at a substantially horizontal grade, the cutting edge 31 is set in a neutral position relative to the runner 54 or in the plane of travel 63. In this position the adjusting lever 49 is at a midpoint of shiftability between the two stops 61, 62 limiting its movement. That is, the ground runner is now free to move within these predetermined limits in either direction above or below the plane of travel 63 in parallelism with and in the same direction as the blade assembly 27. When the operator desires to cut a grade of constant slope, he first cuts a plane of travel of the desired slope and then sets the cutting edge 31 in the neutral position. To vary the slope of the plane of travel 63, the operator sets the cutting edge 31 above or below the plane of travel 63.

Figure 3:
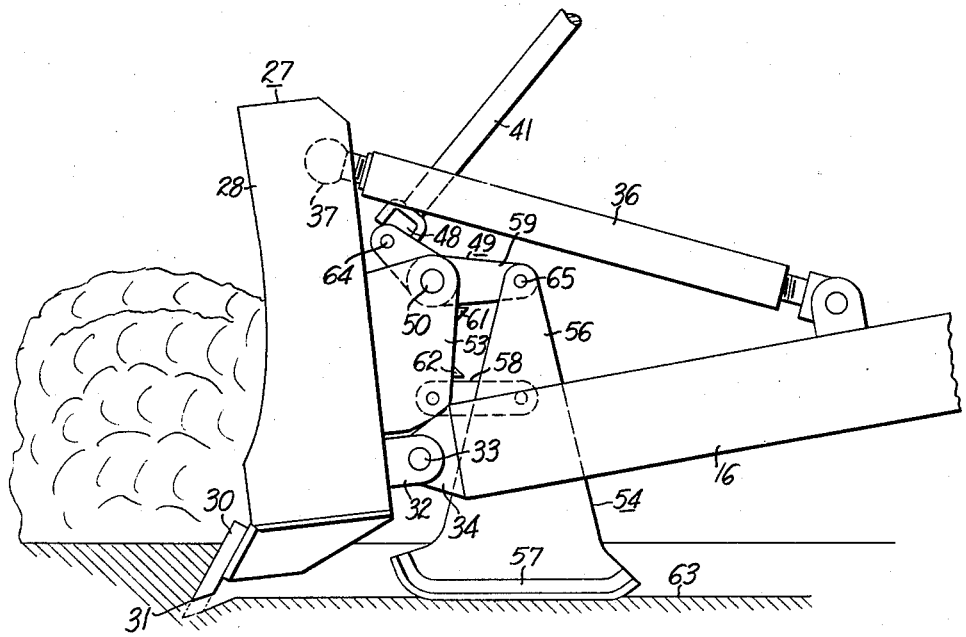

When the blade 30 encounters extremely hard earth or when the tractor 11 noses downwardly, it tends to penetrate more deeply. Referring to Fig. 3, the downward motion of the blade 30 causes the adjusting lever 49 to move in a clockwise direction about the pivotal axis 64 and exert a downward thrust on the runner 54. This downward thrust is resisted by the ground reaction forces which tend to pivot the adjusting lever 49 in a counterclockwise direction. As a consequence, the cutting edge 31 of the blade 30 is restored to the cutting depth at which it was originally set.

Figure 4:
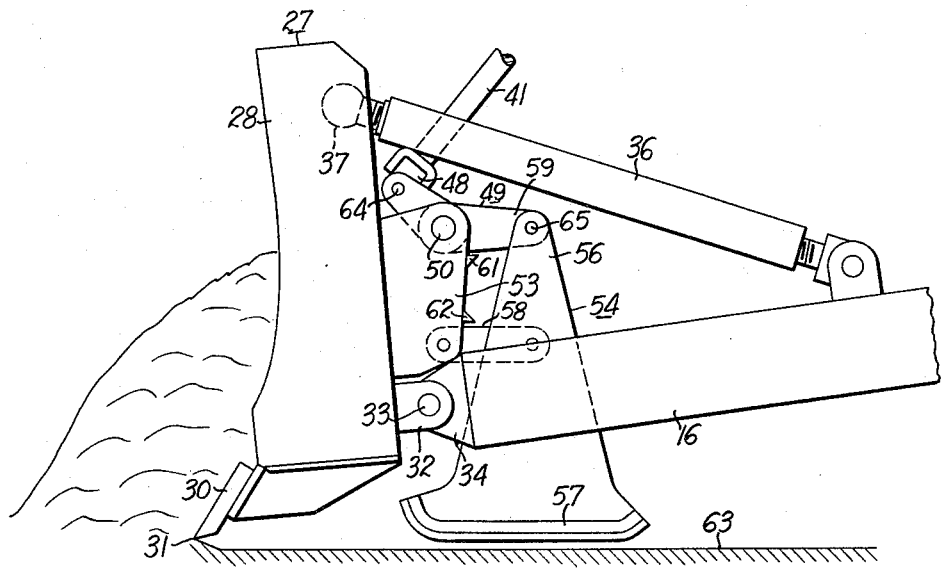
Fig. 4 is a fragmentary view illustrating the mode of operation of the trailing runner when the blade tends to rise from its parallel path of travel.

If for some reason the blade 30 is caused to rise above the plane of travel 63, the runner 54 is also raised above the plane of travel 63 and the downward thrust exerted by tractor 11, advancing over the plane of travel 63 tends to restore the cutting edge 31 to its original setting. Referring to Fig. 4, any upward motion of the blade 30 causes the adjusting lever 49 to rock in a counterclockwise direction about the pivotal axis 64. This upward motion will also cause the ground runner 54 to be lifted from its contact with the ground or plane of travel 63. The runner 54 will therefore present no resistance to the downward thrust exerted upon the blade assembly 27 by the forward advance of the tractor 11, and the cutting edge 31 will be returned to the plane of travel. As it is urged downwardly it imparts a clockwise rotational movement to the adjusting lever 49 and again repositions the ground runner 54 in proper operating relationship with the cutting edge 31.

By reason of the above described yieldability of the blade assembly 27 in parallelism with the runner 54, the depth of the penetration of the cutting edge of a bulldozer can be automatically controlled. The present invention makes it possible for the operator of a tractor on which a bulldozer is mounted to cut a level surface without requiring his continual attention. It also makes it possible for the cutting edge to produce a uniform cut that is not affected by the unevenness of the terrain over which the tractor passes or by the forward pitching of a tractor.

In this connection it is to be understood that any suitable means, power operated or otherwise, may be provided for adjustably setting the lever 49 in a particular position. In the applicant's preferred embodiment the hydraulic jacks used to raise and lower the push beams are also used to set the position of the lever 49. This eliminates the necessity for providing a second pair of hydraulic jacks or some other power system.

It is quite apparent that this type of mechanism may be used on substantially any material moving implement having a transverse cutting edge which is pushed over the ground by a tractor or other vehicle. The type of tractor is not material to the proper operation of the applicant's depth controlling mechanism.

While only one particular embodiment in the applicant's invention has been described herein, it should be understood the applicant's invention is not restricted thereto and that it is intended to cover all modifications of the invention which would be apparent to one skilled in the art and that come within the scope of the appended claims.

What is claimed is:

1. In an implement adapted to be raised and lowered with respect to a motor vehicle and to be pushed by said vehicle, said implement having a blade assembly with a ground contacting cutting edge transversely disposed in front of said vehicle, an improvement comprising: a ground runner disposed in trailing relationship to said cutting edge, linkage means for connecting said ground runner to said blade assembly for vertical parallel movement with respect to said blade assembly and thrust transmitting means including an adjustable guide link pivotally connected between the vehicle body and said linkage means for maintaining the latter in spaced relationship to the former and for allowing said ground runner to move vertically in parallelism relative to said blade assembly as the depth of penetration of said cutting edge varies from a predetermined setting in order to return the cutting edge to said predetermined setting.

2. In an implement adapted to be raised and lowered with respect to a motor vehicle and to be pushed by said vehicle, said implement having a blade assembly with a ground contacting cutting edge transversely disposed in front of said vehicle, an improvement comprising: a ground runner disposed in trailing relationship to said cutting edge, a rockable parallel link operatively connecting said ground runner to said blade assembly and having a depending lever arm, a parallel link vertically spaced from said rockable link and operatively connecting a portion of said ground engaging means to said blade assembly, means connecting with said lever arm for adjustably holding said rocking link for pivotal movement about an axis substantially fixed in relationship to said tractor and permitting said ground engaging means to move in parallelism with respect to said cutting edge when the operating depth of said cutting edge varies from a predetermined setting in order to return the cutting edge to said predetermined setting.

3. A depth control mechanism for an implement adapted to be raised and lowered with respect to a motor vehicle and to be pushed by said vehicle, said implement having a blade assembly with a ground contacting cutting edge transversely disposed in front of said vehicle, said mechanism comprising: a ground runner disposed in trailing relationship to said cutting edge and having an upstanding portion, an adjusting lever pivotally connected at one end to said upstanding portion, a first pivot means connecting said adjusting lever at an intermediate point to the rearward side of said blade assembly, a second pivot means disposed at the other end of said lever and serving as a fulcrum for said lever, a contractible and extensible means operatively interposed between said second pivot means and said vehicle, and adjustably positioning said pivot means to provide a fulcrum for said lever through a predetermined range of substantially fixed positions relative to said tractor, and means maintaining said upstanding portion in substantially normal relationship to the ground as it advances over the ground.

4. A depth control mechanism for an implement adapted to be raised and lowered with respect to a motor vehicle and to be pushed by said vehicle, said implement having a blade assembly with a ground contacting cutting edge transversely disposed in front of said vehicle, said mechanism comprising: a ground runner disposed in trailing relationship to said cutting edge and having an upstanding portion, an adjusting lever pivotally connected at one end to said upstanding portion, means pivotally connecting said lever at an intermediate point to said blade assembly, a hydraulic ram having a cylinder, piston and piston rod, said cylinder being pivotally connected to said vehicle and said piston rod being pivotally connected to the other end of said adjusting lever, means limiting the vertical movement of said ground runner relative to said cutting edge and means maintaining said upstanding portion in approximate normal relationship to the ground.

5. A depth control mechanism for an implement adapted to be raised and lowered with respect to a motor vehicle and to be pushed by said vehicle, said implement having a blade assembly with a ground contacting cutting edge transversely disposed in front of said vehicle, said mechanism comprising: a ground runner disposed in trailing relationship to said cutting edge and having an upstanding portion, a first parallel link connecting the upstanding portion of said ground runner to the rearward side of said blade assembly and having a projecting lever arm, a second parallel link vertically spaced from said first link and pivotally connecting said ground runner to the rearward side of said blade assembly to permit said ground runner to move in parallelism with said blade assembly, a hydraulic jack having a cylinder, piston and piston rod, said cylinder being pivotally connected to said vehicle and said piston rod being pivotally connected to said projecting lever arm, means limiting the vertical motion of said ground runner relative to said cutting edge to permit said blade assembly to be raised and lowered when said ground runner is limited by said means.

6. A depth control mechanism for an implement mounted on a pair of push beams disposed along opposite sides of a vehicle and pivotally connected at their rearward ends to a portion of said vehicle, said implement having a cutting edge transversely disposed in front of said vehicle, said mechanism comprising: a ground runner disposed in trailing relationship to said cutting edge and having an upstanding portion, a first parallel link connecting said upstanding portion to said implement and presenting a depending lever arm, a second parallel link vertically spaced from said parallel link and pivotally connecting said ground runner to said implement to permit movement of the latter in parallelism with said ground runner, a hydraulic jack operatively interposed between said depending lever arm and said vehicle to selectively move the implement and ground runner between a raised position and ground engaging position, upon adjustment of said implement and ground runner into ground engagement said hydraulic jack serves as a guide link having one end pivotally connected to said lever arm, and means limiting the degree of relative movement of said ground runner in parallelism relative to said implement.

7. In an earth moving implement adapted to be connected to a motor vehicle in a vertically swingable relation thereto and having a ground contacting cutting edge transversely disposed in front of said vehicle, the combination comprising: a ground runner positioned at the point adjacent to and rearward of said cutting edge, a pair of vertically spaced parallel links operatively connecting said ground runner in parallelism with said implement, one of said links having a depending lever arm, power adjustable means carried on the vehicle and connected to said depending lever arm for transmitting thrust between the latter and said vehicle, said power means having a first and second range of travel, over said first range of travel said power means being operative to move the implement and ground runner between a raised and ground engaging position, in said ground engaging position said power means providing a second range of travel for positively relatively moving said ground runner in parallelism with said implement, and an abutment means cooperating with said lever arm to limit the position of said cutting edge relative to said ground runner during said second range of travel.

8. A bulldozer attachment for a tractor comprising: a pair of push beams extending laterally on opposite sides of said tractor and pivotally connected at their rearward ends to a portion of said tractor, a blade assembly extending transversely in front of said tractor and supported by said push beams, said blade assembly having a ground contacting cutting edge, a ground runner disposed in trailing relationship to said cutting edge, a pair of vertically spaced parallel links pivotally connecting said ground runner to said blade assembly, one of said parallel links having a depending lever arm, means for shifting said depending lever arm to vary the vertical position of said ground runner relative to said cutting edge and means limiting said vertical movement relative to said ground runner.

9. A bulldozer attachment for tractors comprising: a pair of push beams extending laterally on opposite sides of said tractor and pivotally connected at their rearward ends to a portion of said tractor, a blade assembly supported by said push beams and having a ground contacting cutting edge disposed transversely in front of said tractor, a pair of ground runners having an upstanding portion, a first link pivotally connecting each of said upstanding portions to said rearward side of the blade assembly and presenting a depending lever arm, a hydraulic ram operatively interposed between each of said depending lever arms and said tractor, a second parallel link vertically spaced from each of said first links and pivotally connecting said upstanding portions of the ground runner to said rearward side of the blade assembly and means limiting the vertical movement of said ground runner relative to said cutting edge and permitting the ground runners within said limits of vertical movement to yieldingly maintain the cutting edge at a uniform depth penetration.

References Cited in the file of this patent

UNITED STATES PATENTS

| 1,637,811 | Ferguson | Aug. 2, 1927 |
| 2,511,123 | Norris | June 13, 1950 |
| 2,624,132 | Henry | June 6, 1953 |
| 2,704,015 | Wilson | Mar. 15, 1955 |

FOREIGN PATENTS

| 129,656 | Sweden | Oct. 10, 1950 |